Patented Dec. 12, 1922.

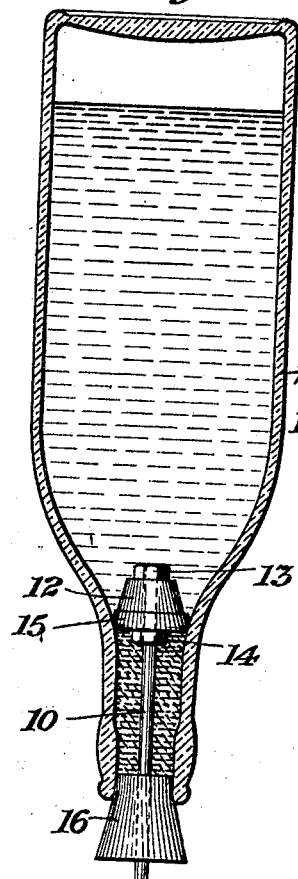
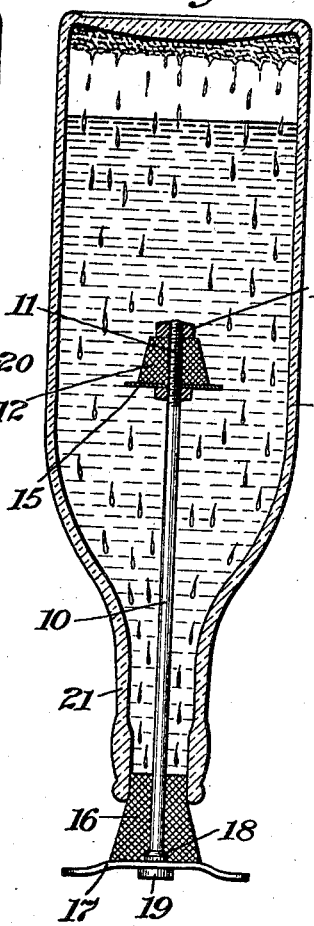
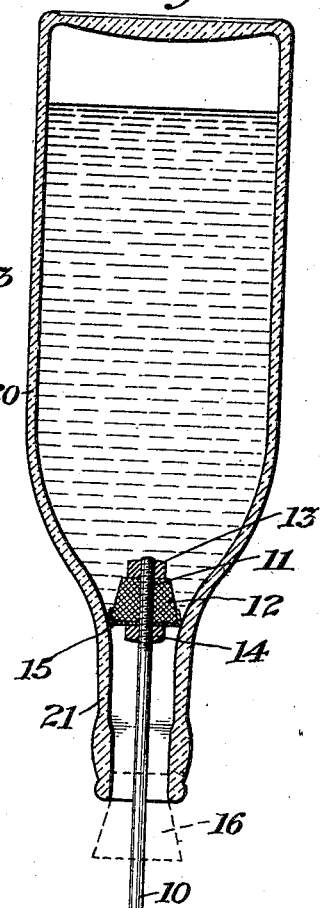
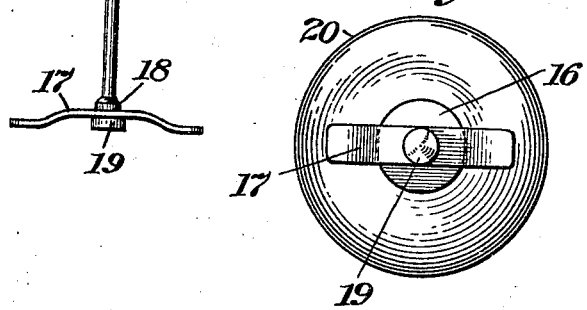

1,438,723

UNITED STATES PATENT OFFICE.

JOHN J. RAIRDEN, OF BROOKLYN, NEW YORK.

SEDIMENT REMOVER.

Application filed April 29, 1922. Serial No. 557,345.

*To all whom it may concern:*

Be it known that I, JOHN J. RAIRDEN, a citizen of the United States, residing in the borough of Brooklyn, county of Kings, city and State of New York, have invented an Improvement in Sediment Removers, of which the following is a specification.

This invention relates to a device for removing sediment from a vessel or other container after the sediment has been permitted to settle therein thereby obviating the inconvenience and difficulties in filtering liquids to remove the sediment therefrom.

The apparatus made in accordance with the invention preferably comprises a rod with a plunger secured thereto and a stopper associated therewith in such a manner that the plunger is movable freely in the stopper in order that in the use of the apparatus the stopper may be placed in the mouth or outlet of a vessel or container and the plunger caused to extend into the same to permit the sediment in the liquid which may be placed in the container to settle upon the stopper and when the sediment has settled to a sufficient extent to permit the operator by moving the rod to cause the plunger to close the neck of the vessel upon the sediment in order that the liquid may be contained in the vessel and upon removing the stopper the collected sediment may be either washed out or withdrawn by withdrawing the plunger, as will be hereinafter more particularly described.

In the drawing:

Fig. 1 is a sectional elevation of the sediment remover made in accordance with my invention as employed in removing sediment from a liquid placed in a bottle.

Fig. 2 is a similar view showing the parts in another position.

Fig. 3 is also a similar view showing the parts in the position they assume after the sediment is removed, and Fig. 4 is an inverted plan of the parts in the position shown in Fig. 1.

Referring particularly to the drawing, the device made in accordance with my invention comprises a rod 10 made of any suitable and preferably metallic material of such a nature that it is not affected by water or other liquids. One end of this rod is screw threaded as indicated at 11 and fitted with a plunger 12 which is secured in position thereon by means of nuts 13, 14 or otherwise. Also as indicated in the drawing, I may employ a washer or wiper indicated at 15 placed between the plunger 12 and the outer nut 14.

The rod 10 passes through and is freely movable in a stopper 16. The stopper may be made of cork or rubber or other suitable material and of such a size as to fit the mouth of a bottle or other vessel with which the device is adapted to be used. At the outer end the rod 10 is fitted with a handle 17 secured in position between a flange 18 and the head 19 of the rod. This handle may be made in any suitable manner and in such a shape as to act also as a support for the bottle or other vessel when inverted, as hereinafter described, to permit the sediment in the liquid to settle into the neck of the bottle.

In the drawing a bottle is indicated at 20, and the neck thereof is designated by 21. In the use of the apparatus the liquid from which it is desired to remove the sediment is placed in the bottle, the sediment remover then inserted and caused to assume the position shown in Fig. 1, the bottle being inverted and permitted to stand in the inverted position upon a table or other suitable support by means of resting upon the handle 17. The bottle with the sediment remover thus in place is permitted to stand sufficiently long for the sediment to settle into the neck of the bottle as indicated in Fig. 2, when, as will be understood, without removing the stopper the rod may be withdrawn by moving the same within the stopper sufficiently far to cause the plunger to close the neck of the bottle and completely encase the sediment which has settled in the neck of the bottle. In so doing, as will be understood, the washer when employed wipes the surfaces leading to the neck of the bottle before the neck is closed by the plunger. The bottle may then be retained in the inverted position or placed in any desired position and the stopper removed, it being understood that the plunger closes the neck of the bottle so as to prevent the contents thereof escaping and also preventing the admission of any material to the bottle. With the parts in this condition the sediment collected in the neck of the bottle may either be washed therefrom by a stream of water or otherwise or withdrawn from the neck of the bottle by entirely removing the plunger. It will furthermore be understood that if the sediment is not entirely removed from the liquid in the bottle in one operation, as hereinbefore described, the operation may be repeated as many times as is necessary to entirely remove the sediment or to remove the same to the desired extent.

I claim as my invention:

1. A sediment remover comprising a rod, a stopper in which the rod is movable, and a device associated with the rod for removing sediment from the neck of a container.

2. A sediment remover comprising a rod, a stopper through which the rod is movable, and a device associated with the rod for closing the neck of a container after the sediment in a liquid therein has settled into the said neck of the container.

3. A sediment remover comprising a rod, a stopper in which the rod is movable and which is adapted to close the mouth of a container, and a plunger connected to the said rod and adapted to close the neck of the container after the sediment has settled therein.

4. A sediment remover comprising a rod, a stopper in which the rod is movable and which is adapted to close the mouth of a container, a plunger connected to the said rod and adapted to close the neck of the container after the sediment has settled therein, and means associated with the plunger for wiping the inner surface of the neck of the container.

5. A sediment remover comprising a rod, a stopper in which the rod is movable and which is adapted to close the mouth of a container, a plunger connected to the said rod and adapted to close the neck of the container after the sediment has settled therein, a washer connected to the said rod and plunger for wiping the inner surface of the neck of the container.

6. A sediment remover comprising a rod, a stopper through which the rod is movable, a plunger connected to the said rod for closing the neck of a bottle, the sediment from the liquid in which is to be removed, and means connected to the rod for moving the same and also for supporting the bottle while the sediment is settling in the neck thereof.

7. A sediment remover comprising a rod, a stopper through which the rod is movable, a plunger connected to the said rod for closing the neck of a bottle, the sediment from the liquid in which is to be removed, and a handle support connected to the said rod for moving the same and also for supporting the bottle while the sediment is settling in the neck thereof.

Signed by me this 25th day of April, 1922.

JOHN J. RAIRDEN.